(12) United States Patent
Ortuno Ayuso et al.

(10) Patent No.: US 12,172,728 B2
(45) Date of Patent: Dec. 24, 2024

(54) ADJUSTABLE SUSPENSION COMPRISING A FLUID DISTRIBUTION DEVICE

(71) Applicant: DECATHLON, Villeneuve D'Ascq (FR)

(72) Inventors: Pablo Ortuno Ayuso, Villeneuve D'Ascq (FR); Zigor Garate, Villeneuve D'Ascq (FR)

( * ) Notice: Subject to any disclaimer, the term of this patent is extended or adjusted under 35 U.S.C. 154(b) by 686 days.

(21) Appl. No.: 17/422,212

(22) PCT Filed: Mar. 5, 2020

(86) PCT No.: PCT/FR2020/050441
§ 371 (c)(1),
(2) Date: Jul. 12, 2021

(87) PCT Pub. No.: WO2020/193895
PCT Pub. Date: Oct. 1, 2020

(65) Prior Publication Data
US 2022/0081061 A1 Mar. 17, 2022

(30) Foreign Application Priority Data
Mar. 22, 2019 (FR) ...................................... 1903005

(51) Int. Cl.
*B62K 25/08* (2006.01)
*F16F 9/02* (2006.01)
*F16F 9/18* (2006.01)

(52) U.S. Cl.
CPC ............ *B62K 25/08* (2013.01); *F16F 9/0236* (2013.01); *F16F 9/0245* (2013.01); *F16F 9/185* (2013.01)

(58) Field of Classification Search
CPC ...... B62K 25/08; F16F 9/0236; F16F 9/0245; F16F 9/185
See application file for complete search history.

(56) References Cited

U.S. PATENT DOCUMENTS

| | | | |
|---|---|---|---|
| 9,057,416 B2 | 6/2015 | Talavasek | |
| 9,682,604 B2 * | 6/2017 | Cox | ...................... F16F 9/3264 |
| 10,036,443 B2 * | 7/2018 | Galasso | ............... B62K 25/286 |
| 10,086,670 B2 * | 10/2018 | Galasso | ............... B60G 17/019 |
| 10,414,236 B2 * | 9/2019 | Cox | ...................... B60G 11/14 |

(Continued)

FOREIGN PATENT DOCUMENTS

EP 2573420 A2 3/2013

*Primary Examiner* — Tony H Winner
*Assistant Examiner* — Michael R Stabley
(74) *Attorney, Agent, or Firm* — Cabinet Beau de Lomenie; Jonathan Bingham; Brian Gordaychik

(57) ABSTRACT

Adjustable suspension comprising a suspension body having a bottom, a piston disposed in the suspension body and comprising a piston head, the bottom and the piston head delimiting a main chamber inside said suspension body, the piston being movable in translation in the suspension body; and a fluid distribution device comprising a main fluid inlet configured to inject a fluid into the suspension and a fluid outlet, the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet to the fluid outlet in order to evacuate the fluid out of the suspension.

16 Claims, 11 Drawing Sheets

(56) References Cited

U.S. PATENT DOCUMENTS

| | | |
|---|---|---|
| 2011/0181009 A1 | 7/2011 | Lude |
| 2012/0080279 A1 | 4/2012 | Galasso |
| 2012/0136537 A1 | 5/2012 | Galasso |
| 2018/0334219 A1 | 11/2018 | Walthert |

* cited by examiner

[Fig. 1]
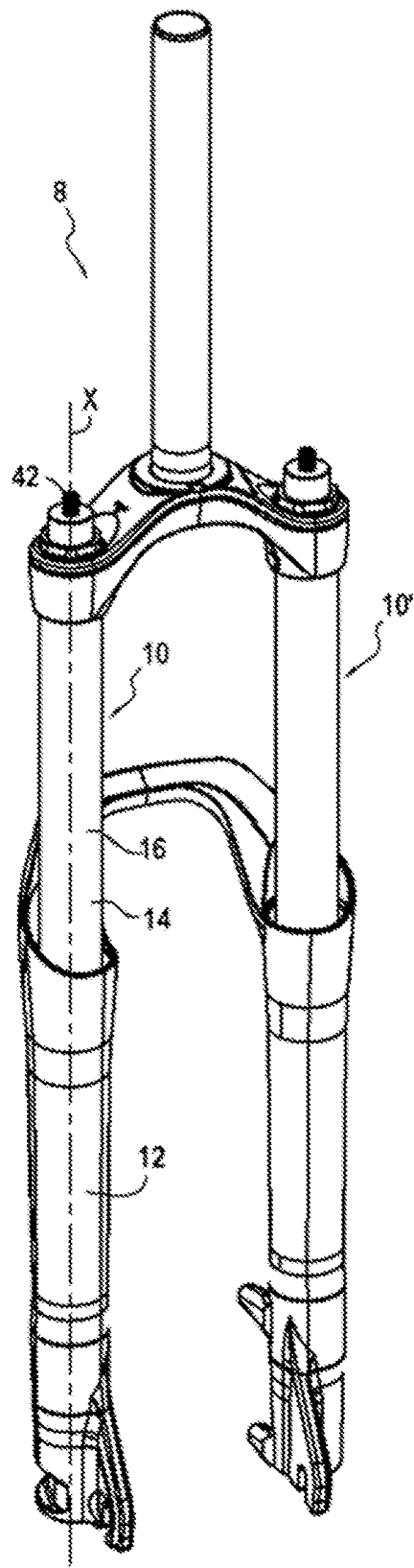

[Fig. 2]
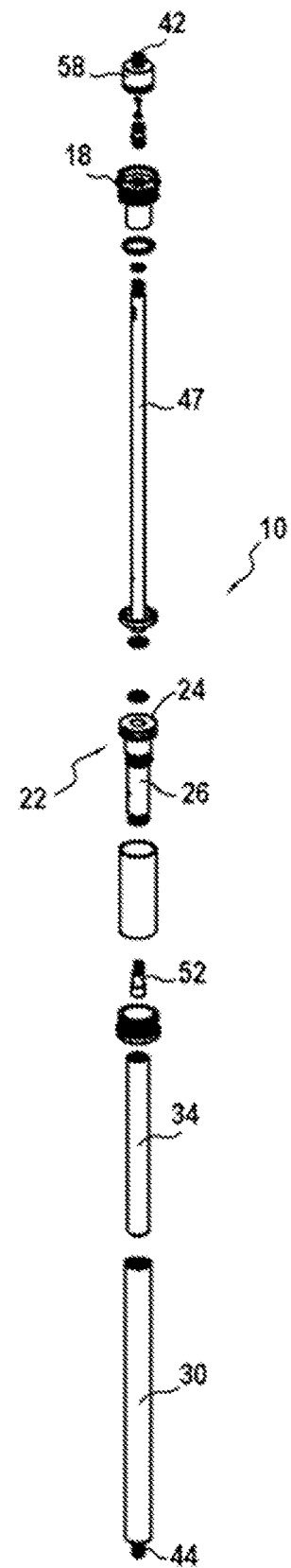

[Fig. 3]
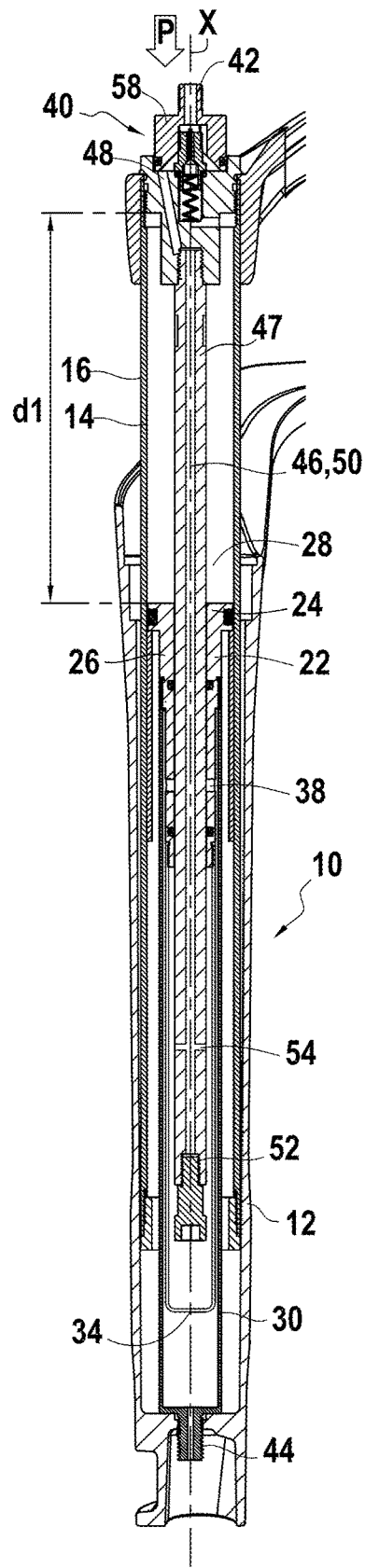

[Fig. 4]
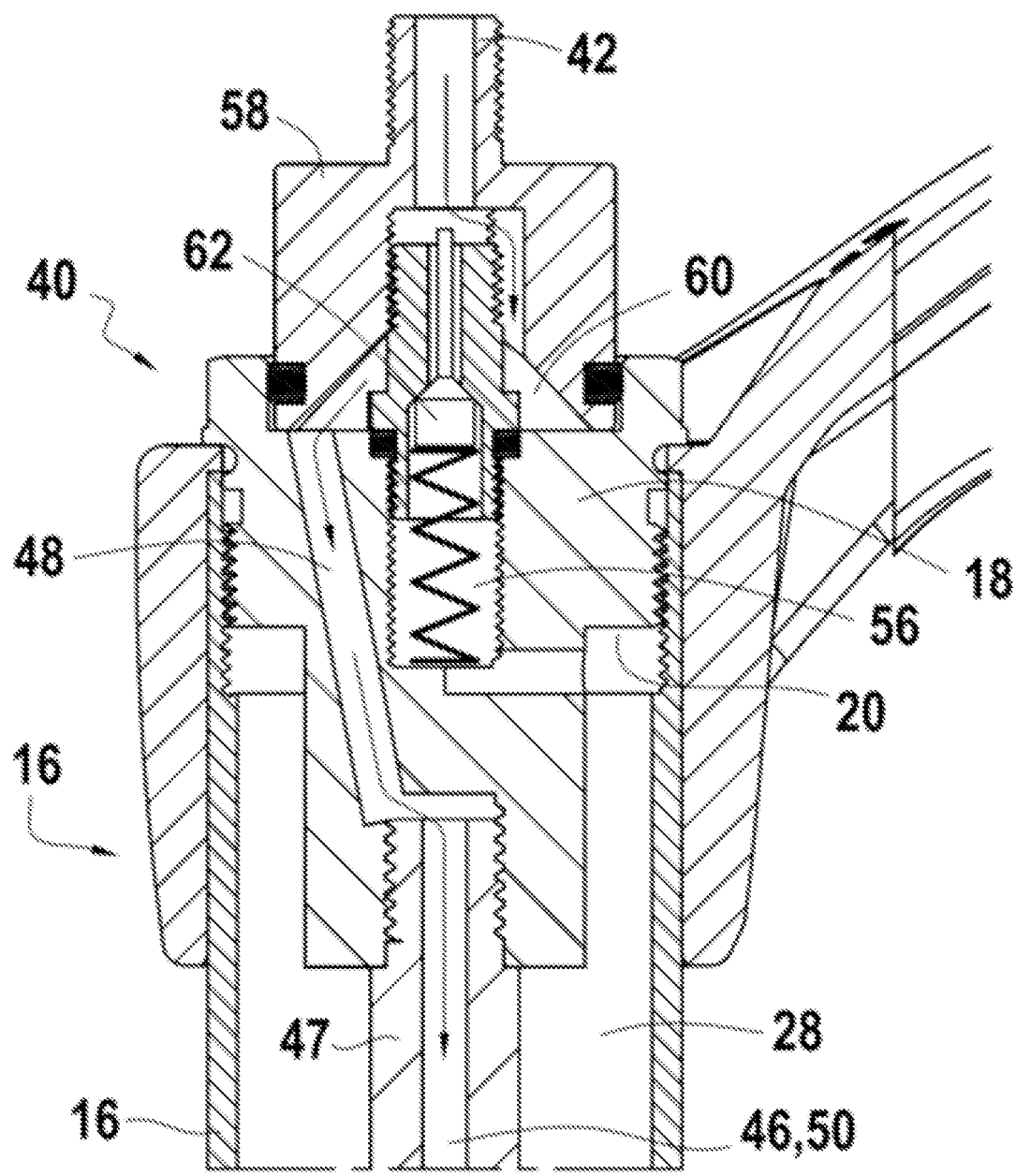

[Fig. 5]
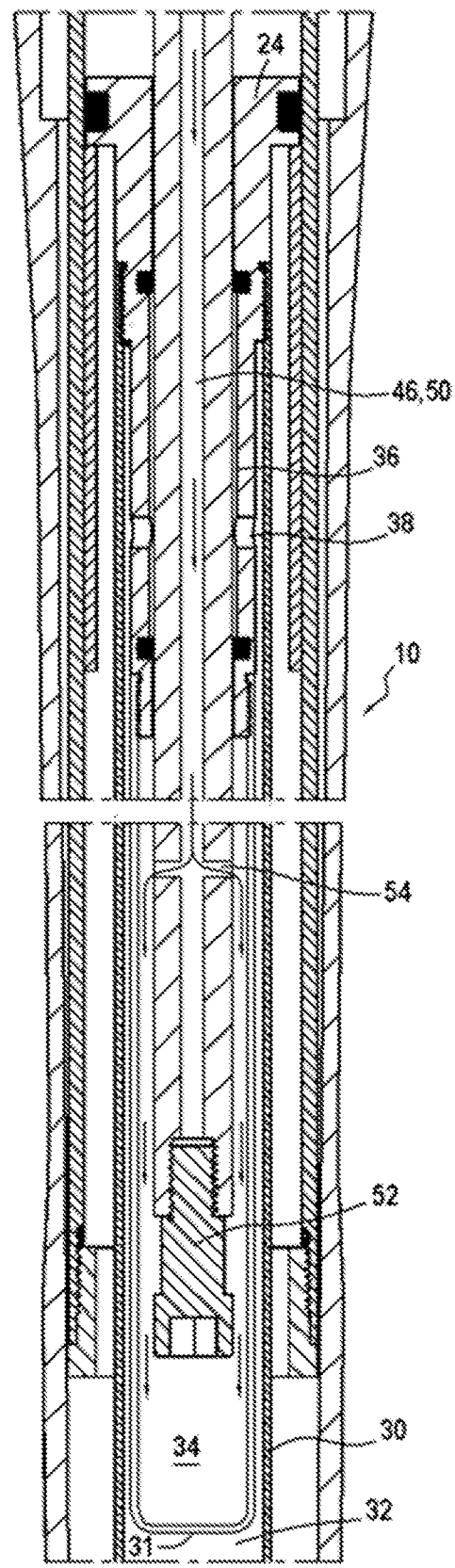

[Fig. 6]
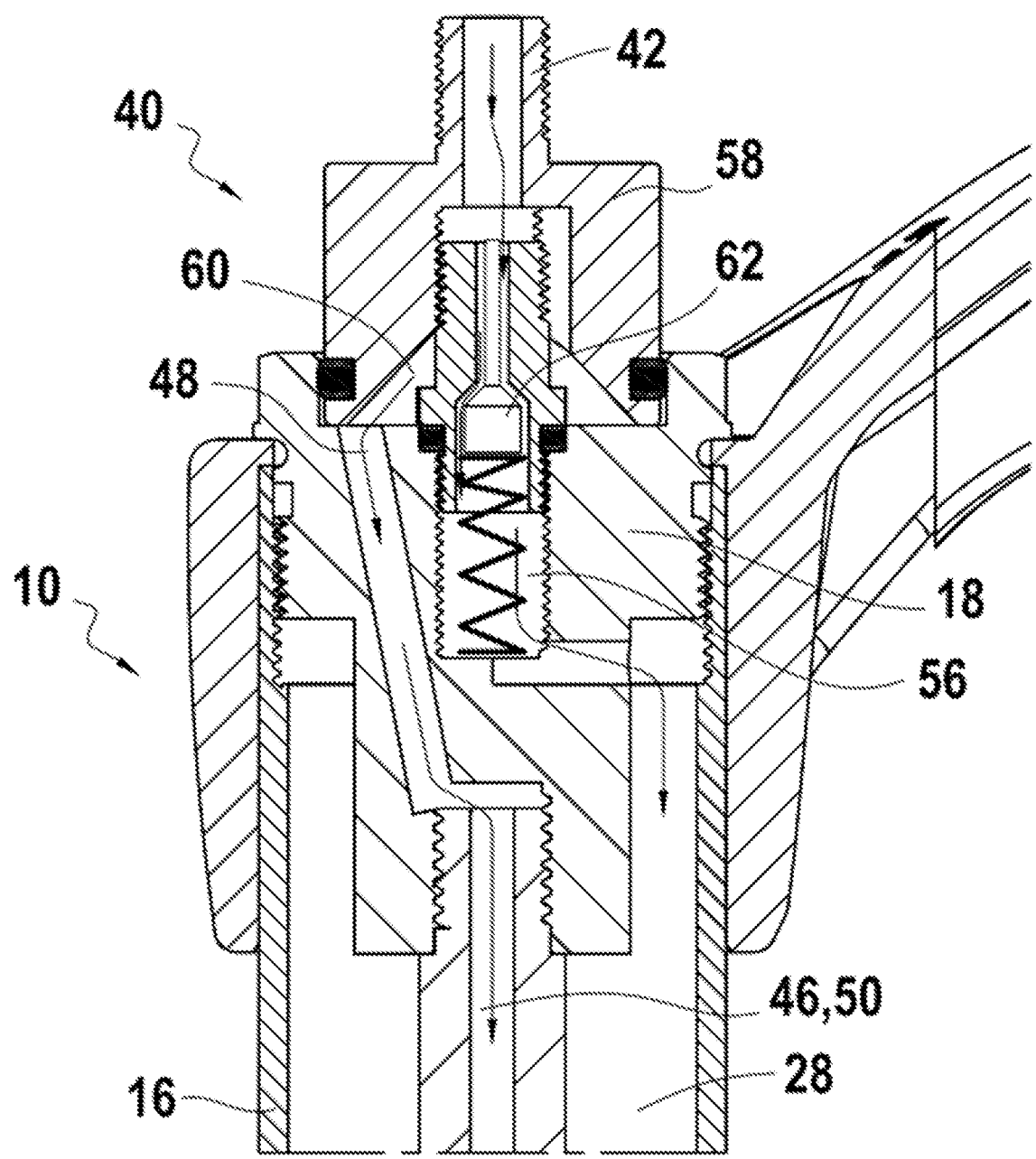

[Fig. 7]
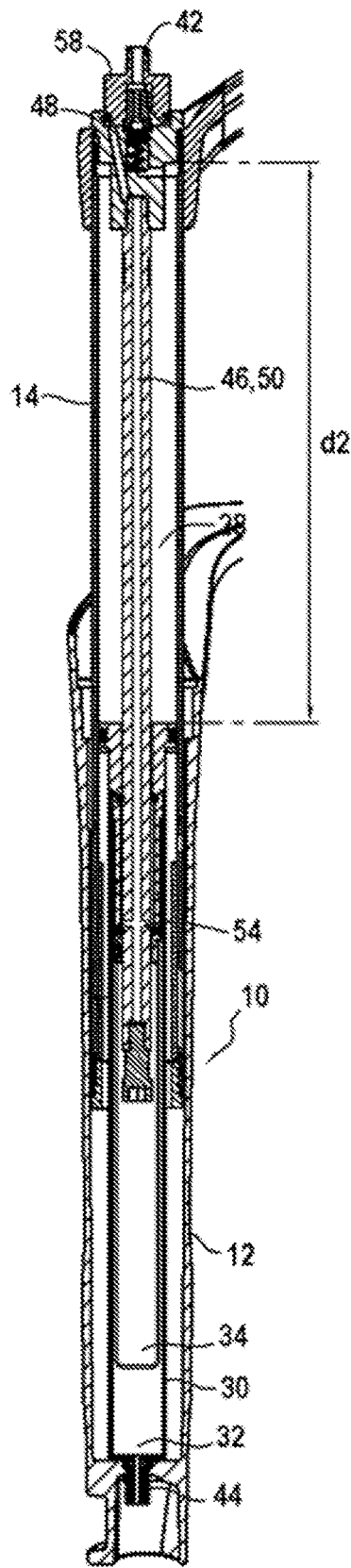

[Fig. 8]
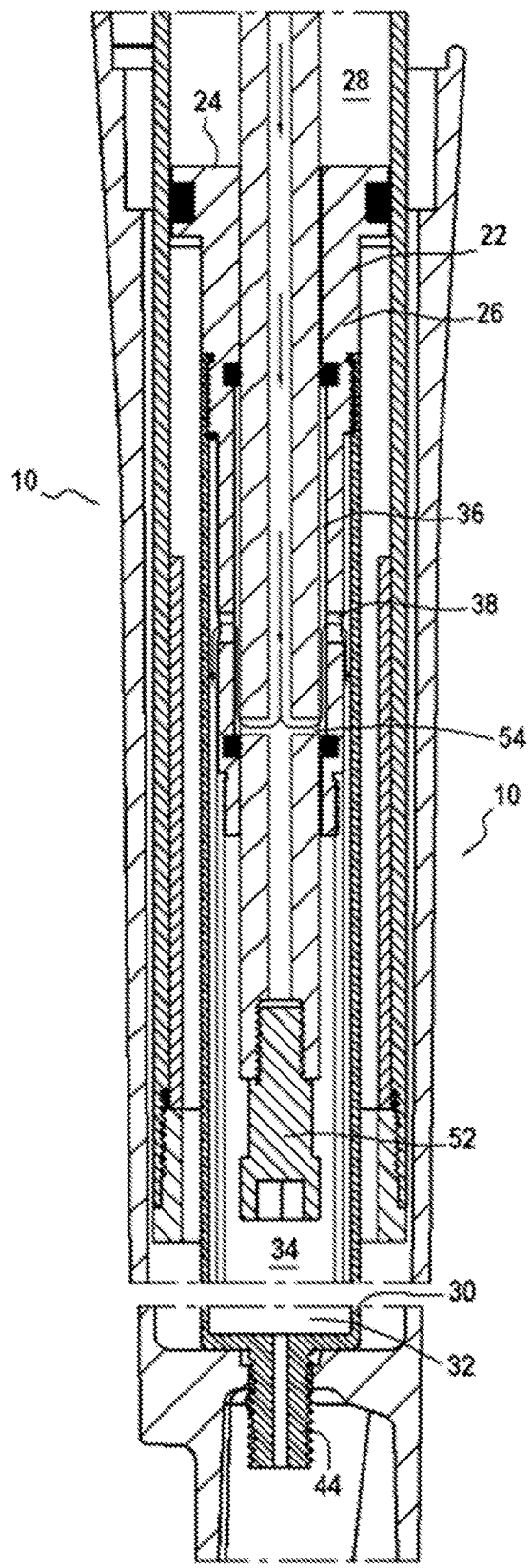

[Fig. 9]
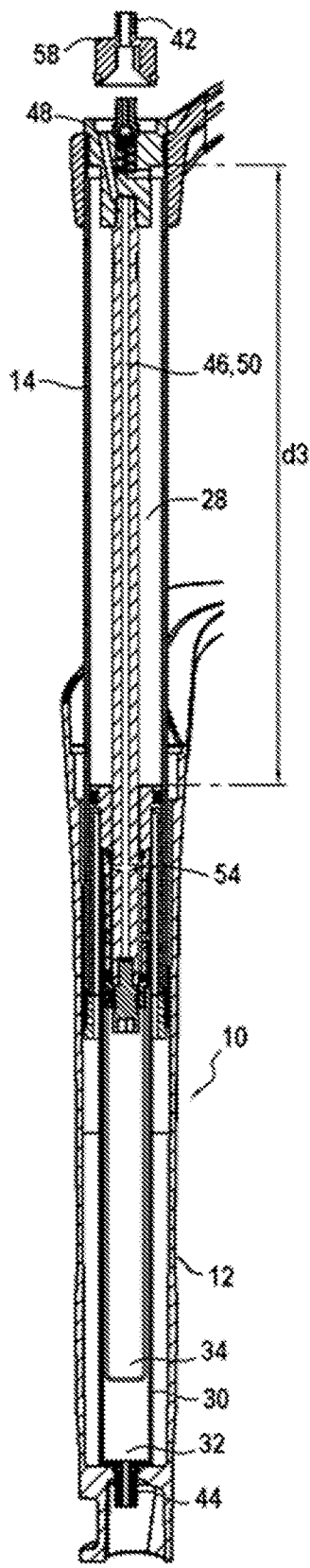

[Fig. 10]
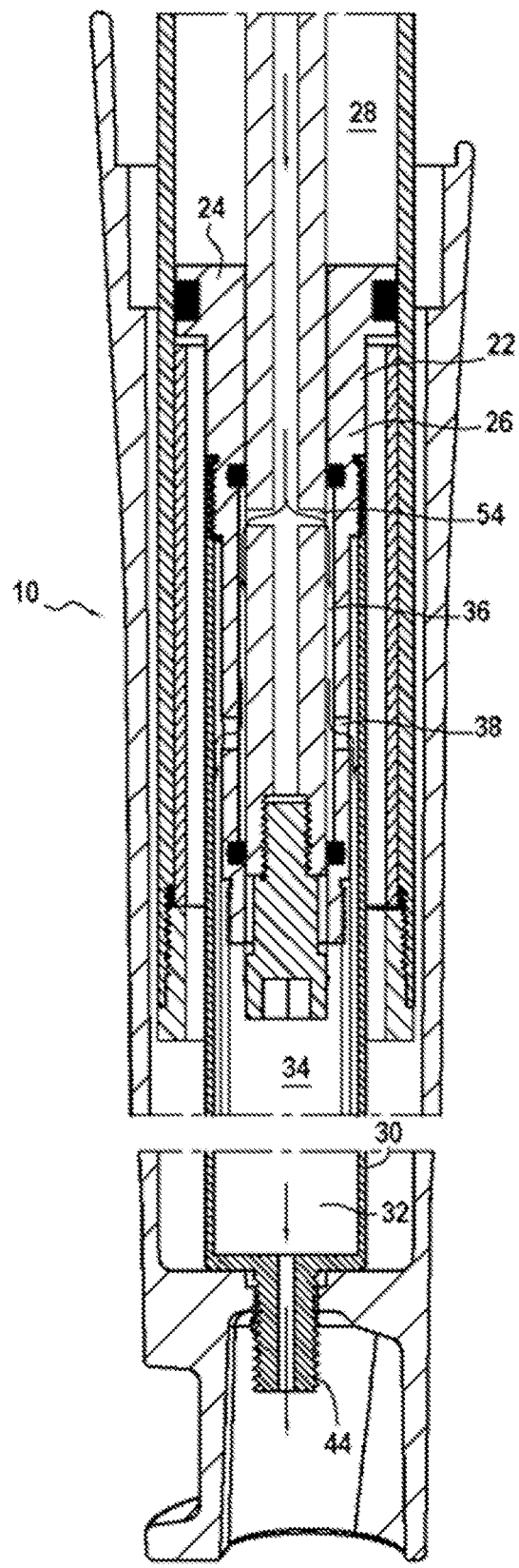

[Fig. 11]
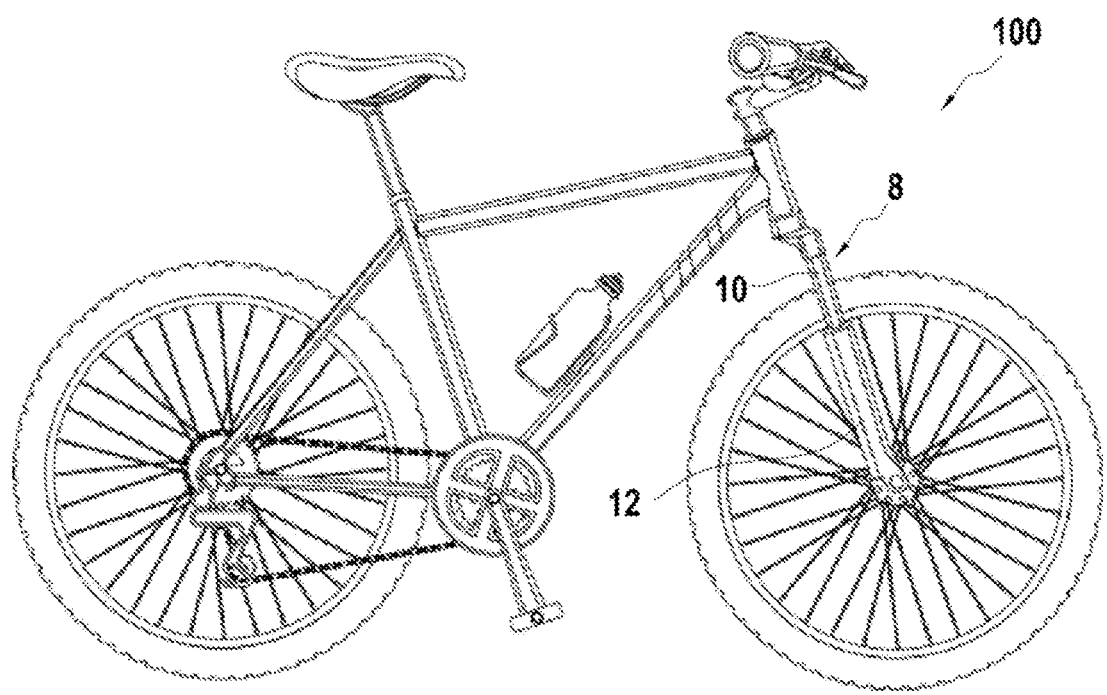

ADJUSTABLE SUSPENSION COMPRISING A FLUID DISTRIBUTION DEVICE

TECHNICAL FIELD

The present disclosure relates to the field of adjustable bicycle suspensions and in particular suspensions whose preload can be adjusted. Such suspensions can equip a bicycle fork or shock absorber.

The preload of a suspension is also called SAG, and corresponds to the collapse of the suspension depending on the weight of the user. The preload is generally associated with a percentage of the total stroke of the suspension between a compressed position and an uncompressed position. The appropriate preload is different for each user and must therefore be adjusted before using the bicycle.

BACKGROUND

Mechanical spring bicycle suspensions, are known, in which the preload is adjusted by adjusting the load exerted on the spring at rest. A disadvantage of these suspensions is that the mechanical spring is generally very heavy and that it does not provide a sufficiently large preload adjustment range. Also, it is sometimes necessary to change the mechanical spring according to the weight of the user.

Air suspensions are also known in which the preload is adjusted by adjusting the air pressure in the suspension.

The pressure is generally adjusted manually using a manual air pump. A pressure adjustment procedure by trial and error is then carried out, in which it is generally necessary to inject air into the suspension and then to eject air out of the suspension several times.

The preload adjustment procedure then involves a large and tedious repetition of steps in order to obtain the desired preload.

It is also known from document EP2573420 a suspension comprising a main chamber, a secondary chamber and a movable control element allowing to alternately communicate the main chamber with the secondary chamber and the secondary chamber with the outside of the suspension, in order gradually reduce the pressure in the main chamber.

The pressure in the main chamber is therefore initially brought to an excessive value then is reduced manually and by trial and error by the user, until reaching a preload which seems suitable to him.

A disadvantage of this suspension is that the user must estimate himself when the preload seems satisfactory to him and that he is not guided in this adjustment. He cannot therefore adjust the preload to a value adapted to his own weight. Adjusting the preload is particularly long, difficult and imprecise.

Furthermore, if the pressure in the main chamber becomes insufficient, the user must again inject air into the suspension and repeat the actions of manual adjustment of the preload, which is very restrictive.

SUMMARY

A purpose of the present invention is to provide an adjustable suspension for a bicycle overcoming the aforementioned problems.

For this purpose, the invention relates to an adjustable suspension for a bicycle, comprising:
- a suspension body having a bottom;
- a piston disposed in the suspension body and comprising
  - a piston head, the bottom and the piston head delimiting a main chamber inside said suspension body, the piston being movable in translation in the suspension body; and
- a fluid distribution device comprising a main fluid inlet configured to inject a fluid into the suspension and a fluid outlet, the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet to the fluid outlet in order to evacuate the fluid out of the suspension.

Without departing from the scope of the invention, the suspension may be a bicycle front suspension or rear suspension. Without limitation, it may be a pneumatic and/or hydraulic suspension.

The main inlet can be connected to a pump or to a fluid cartridge, in order to inject the fluid into the suspension. The fluid outlet opens out of the adjustable suspension.

The suspension may comprise an outer tube and an inner tube movable in translation inside the outer tube. The piston may be secured to the outer tube so that it is fixed relative to said outer tube. The inner tube may form the suspension body, so that the main chamber is formed in the inner tube. The main fluid inlet may be secured to the inner tube, so that it is fixed relative to said inner tube. The piston and the suspension body may describe a relative translational movement relative to each other, along a sliding axis.

To adjust the preload of the suspension, the user may get on the bicycle in order to exert his weight thereon, so as to exert his weight on the suspension in order to compress it. Without departing from the scope of the invention, the suspension can be compressed in various ways, for example by placing a weight on the bicycle. Given the weight exerted, the piston is displaced to the bottom of the suspension body and is placed in the first position. The user then injects fluid, for example air, gas or liquid, via the main fluid inlet. The piston cooperates with the fluid distribution device to fluidly communicate the main chamber and the main fluid inlet. The fluid is therefore guided until the main chamber, which has the consequence of increasing the pressure therein and therefore the preload (or SAG). The fluid then exerts a force on the piston so that the latter is deployed and moves away from the bottom of the suspension body. The inner tube is displaced upwardly in translation relative to the outer tube.

The piston is then placed in the second position, in which the distribution device fluidly communicates the main fluid inlet and the fluid outlet. The fluid injected through the main fluid inlet is therefore guided directly to the fluid outlet and is evacuated out of the adjustable suspension. The fluid is then no longer injected into the main chamber. In the second position, if the fluid injection is continued, the injected fluid is not maintained in the main fluid chamber. The fluid injected through the main fluid inlet while the piston is in the second position is directly guided to the fluid outlet. The pressure in the main chamber no longer increases. In this second position, the preload is adjusted at a value adapted to the user.

The piston may move from the first position to the second position by translation along the piston axis.

Thanks to the invention, when the piston reaches the second position, the preload is maintained at a constant value, so that its adjustment is interrupted. The user is therefore not required to adjust the preload by trial and error. When the piston is in the second position, the preload is adjusted precisely and the user does not need to carry out additional manual tests and adjustments. In addition, insofar as the user gets on the bicycle during the adjustment, the adjusted preload depends on his weight.

Furthermore, the invention allows overcoming the risk of introducing too high fluid pressure into the main chamber, which would force the user to empty the fluid present in the main chamber before injecting fluid again via the main fluid inlet.

The preload of the adjustable suspension according to the invention can therefore be adjusted quickly and precisely.

The user can then get off the bike, so that he no longer exerts his weight on the suspension. The suspension is no longer constrained by the weight of the user. Due to the pressure of the fluid present in the main chamber, a force is exerted on the piston, tending to move it further away from the bottom of the suspension body. The piston is brought into a third position, forming a rest position, in which said piston is substantially fully deployed.

Therefore, when the user gest on the bicycle, the piston is translated from the third position to the second position and the stroke of the piston between these third and second positions corresponds to the preload previously adjusted.

Advantageously, the volume of the main chamber when the piston is in the first position is less than the volume of the main chamber when the piston is in the second position. The suspension is adjusted by injecting fluid, gradually increasing the volume of the main fluid chamber to move the piston from the first position to the second position.

The fluid distribution device may be configured so that the fluid injected through the main fluid inlet remains in the suspension when the piston is in the first position. The pressure in the main chamber increases when the preload is adjusted, until the piston reaches the second position. The main fluid chamber does not empty during fluid injection. An advantage is to allow adjustment of the preload only by injecting the fluid.

According to a particularly advantageous aspect of the invention, the fluid distribution device is configured to automatically bring the piston from the first position to the second position when fluid is injected through the main fluid inlet. The fluid injected into the main chamber displaces the piston from the first position to the second position, without additional user intervention. An advantage is to dispense with a step of manual adjustment of the preload. The user can bring the SAG to the appropriate value only by injecting the fluid, so that the adjustment of the preload is facilitated.

Thanks to the invention, the preload adjustment is therefore particularly quick. Furthermore, the SAG is precisely adjusted and maintained at the appropriate value.

The fluid distribution device may comprise a main channel fluidly communicating with the main fluid inlet and including at least one evacuation orifice, the adjustable suspension comprising an enclosure movable in translation with the piston relative to the main channel, the evacuation orifice opening into said enclosure when the piston is in the first position and opening out of the enclosure when the piston is in the second position.

The fluid distribution device may comprise a conduit extending in the suspension body and in which the main channel is formed. Said conduit may be secured to the inner tube of the suspension, so that the main channel is fixed relative to said inner tube.

The enclosure advantageously forms a hermetic chamber with said conduit. The fluid injected through the main fluid inlet, when the piston is in the first position, is brought through the main channel into said enclosure via the evacuation orifice. The main fluid inlet then fluidly communicates with the enclosure via the main channel. The fluid is contained in said enclosure and is not brought to the fluid outlet.

In parallel, the fluid is brought into the main chamber, which has the consequence of displacing the piston in translation relative to the channel and to the evacuation orifice, until the piston is placed in the second position and said evacuation orifice opens out of the enclosure.

In other words, the injection of the fluid into the main chamber leads to the relative displacement in translation of the fluid distribution device, and in particular of the main channel, relative to the assembly formed of the piston and of the enclosure.

In this second position of the piston, the fluid outlet is in fluid communication with the main fluid inlet via the main channel. The injected fluid is therefore brought to the fluid outlet through the main channel.

An advantage of this configuration is that it allows quick fluid communication between the main fluid inlet and the fluid outlet, so as to quickly interrupt the injection of fluid into the main chamber. Furthermore, this fluid communication is carried out automatically by injecting the fluid via the main fluid inlet, which makes it even easier to adjust the preload.

Advantageously, the piston comprises a piston rod cooperating with the piston head, the main channel extending at least partly in said piston rod. The main channel may pass through the piston head. The piston rod and the main channel may extend along the piston axis, so that the main channel is movable in translation along said piston axis, relative to the piston. The main channel is therefore guided in its relative translational movement relative to the piston.

The enclosure may be at least partly disposed in the piston rod. An advantage is to allow the relative displacement of the piston and the enclosure while limiting the overall size of this assembly. The enclosure may have the shape of a cylinder having a diameter slightly smaller than that of the piston rod.

Said at least one evacuation orifice may open into an evacuation chamber fluidly communicating with the fluid outlet, when said piston is in the second position. In the second position of the piston, the evacuation orifice opens into the evacuation chamber so that the fluid injected via the air inlet is brought through the main channel into said evacuation chamber. This evacuation chamber then allows bringing the fluid to the fluid outlet and therefore out of the adjustable suspension.

Advantageously, the enclosure and the main channel extend into the evacuation chamber. An advantage is to reduce the size of the suspension. The evacuation chamber may be cylindrical and have a diameter slightly greater than the diameter of the enclosure. The evacuation chamber is advantageously secured to the piston and to the outer tube of the suspension. The enclosure is may be secured to the evacuation chamber.

The fluid distribution device may further comprise a secondary channel fluidly communicating with the main fluid inlet and with the main chamber in order to bring the fluid injected through the main fluid inlet into said main chamber, when the piston is in the first position. The fluid injected through the main inlet is therefore simultaneously brought into the main channel and into the secondary channel.

According to a particularly advantageous aspect of the invention, the secondary channel comprises a check valve configured to prevent the fluid from escaping from the main chamber when it is in a first state, and to allow the fluid to escape from the main chamber when it is in a second state.

The check valve is configured to allow the entry of the fluid into the main chamber when the pressure of said fluid upstream of said check valve is greater than a predetermined pressure threshold.

When the user starts adjusting the preload and initiates the injection of the fluid, the piston being in the first position, the pressure of the injected fluid is initially insufficient to allow the fluid to enter the main chamber. The fluid is therefore brought into the enclosure.

In this first position of the piston, the fluid distribution device forms a closed assembly configured to contain the injected fluid. Also, the pressure within the enclosure and the main channel gradually increases with the injection of fluid, until reaching the predetermined pressure threshold. Therefore, the check valve opens and allows the entry of the fluid into the main chamber. This causes the piston to displace in a direction opposite the bottom of the suspension body, until the second position.

In the second position of the piston, the injected fluid is brought through the main channel out of the enclosure, to the fluid outlet and out of the suspension. Also, the pressure in the distribution device decreases and becomes lower than the predetermined pressure threshold. The pressure upstream of the check valve is then insufficient to allow the entry of the fluid into the main chamber.

The check valve closes. The amount of fluid and the pressure within the main chamber and therefore the preload then remain constant, even in the event of continued injection of fluid through the main fluid inlet.

An advantage is therefore to precisely regulate the preload by preventing the injection of too much fluid into the main chamber, while reducing the risk that the fluid escapes from the main chamber and therefore that the preload is out of adjustment.

The fluid distribution device may comprise a plug configured to be removably mounted on the suspension body and in which the main fluid inlet is formed, said plug being shaped to establish fluid communication between the main fluid inlet, the main channel and the secondary channel, when said plug is mounted on the suspension body.

An advantage is to reduce the size and weight of the suspension during use by removing said suspension plug. A housing may be formed in the plug, allowing fluid communication between the main fluid inlet, the main channel and the secondary channel. Removing the plug advantageously allows the enclosure to fluidly communicate with the atmosphere, via the main channel. An advantage is to empty the enclosure after adjusting the preload. The fluid within the main chamber is maintained in this main chamber, for example thanks to the check valve, so that the preload remains constant.

Advantageously, the fluid is a gas, for example carbon dioxide. The gas may initially be contained in a gas cartridge connectable to the main fluid inlet to allow injection of the gas into the suspension.

The invention also relates to a method for adjusting an adjustable suspension as described above, comprising the following steps:
the main chamber is fluidly communicated with the atmosphere;
the suspension is compressed so as to evacuate the fluid from the main chamber and place the piston in the first position; and
the fluid is injected into the main chamber through the main fluid inlet of the fluid distribution device so as to displace the piston to its second position, in which the fluid injected through the main fluid inlet is guided to the fluid outlet.

The user may be on the bicycle during the injection of the fluid into the main chamber, so that the adjusted preload is adapted to the weight of said user.

In addition, the invention relates to a bicycle including at least one adjustable suspension as described above.

BRIEF DESCRIPTION OF THE DRAWINGS

FIG. 1 illustrates a fork provided with an adjustable suspension according to the invention;
FIG. 2 is an exploded view of the adjustable suspension of FIG. 1;
FIG. 3 is a sectional view of the adjustable suspension of FIG. 1, the piston being in a first position;
FIG. 4 illustrates the upper portion of the adjustable suspension of FIG. 1, the piston being in the first position;
FIG. 5 illustrates the lower portion of the adjustable suspension of FIG. 1, the piston being in the first position;
FIG. 6 illustrates the upper portion of the adjustable suspension of FIG. 1, the piston being in a second position;
FIG. 7 is a sectional view of the adjustable suspension of FIG. 1, the piston being in the second position;
FIG. 8 illustrates the lower portion of the adjustable suspension of FIG. 1, the piston being in the second position; and
FIG. 9 is a sectional view of the adjustable suspension of FIG. 1, the piston being in a third position;
FIG. 10 illustrates the lower portion of the adjustable suspension of FIG. 1, the piston being in the third position; and
FIG. 11 illustrates a bicycle comprising an adjustable suspension according to the invention.

DETAILED DESCRIPTION

The disclosure relates to an adjustable suspension of a bicycle, the preload of which can be easily adjusted, depending on the weight of the user.

FIG. 1 illustrates a fork 8 provided with two adjustable suspensions 10, 10' in accordance with the present disclosure.

The adjustable suspension 10 comprises, conventionally, an outer tube 12 and an inner tube 14 slidably mounted in the outer tube 12 along a sliding axis X. The inner tube 14 forms a suspension body 16 comprising at the upper portion a connection sleeve 18 forming a bottom 20 of the suspension body, visible in FIG. 4.

FIG. 2 is an exploded view of the adjustable suspension 10 of FIG. 1. In this figure, it can be noted, without limitation, that the adjustable suspension 10 comprises a piston 22 having a piston head 24 and a piston rod 26.

In the sectional view of FIG. 3, it can be seen that the piston 22 is disposed inside the suspension body 16 and delimits with the bottom 20 a main chamber 28 inside said suspension body 16. The piston rod 26 extends along the sliding axis X, so that the piston 22 is slidably mounted along this sliding axis X inside the suspension body 16. The piston 22 therefore describes a relative translational movement with the inner tube 14.

The piston rod 26 comprises a first cylindrical portion 30 secured to the outer tube 12 of the adjustable suspension and delimiting an evacuation chamber 32 extending along the sliding axis X. The piston rod 26 comprises a second cylindrical portion 31 closed at its lower end forming an enclosure 34 inside the piston rod 26 and extending along the sliding axis X. The second cylindrical portion 31 and therefore the enclosure 34 extend inside the first cylindrical portion 30. The evacuation chamber 32, the enclosure 34 and the piston 22 are fixed relative to each other.

The piston rod 26 in addition comprises a cylindrical recess 36 of a reduced length, as well as a hole 38 passing radially through said piston rod 26 so that it fluidly communicates said recess 36 and said evacuation chamber 32.

The adjustable suspension further comprises a fluid distribution device 40 comprising a main fluid inlet 42 disposed in the upper portion of the inner tube 14 forming the suspension body 16, and a fluid outlet 44 disposed in the lower portion of the first cylindrical portion 30 and located in the lower portion of the outer tube 12. The evacuation chamber 32 is in fluid communication with the fluid outlet 44. The fluid outlet 44 opens out of the adjustable suspension 10.

The fluid distribution device 40 moreover comprises a main channel 46. In this non-limiting example, the main channel 46 comprises an inclined portion 48 and a straight portion 50. The inclined portion 48 is formed in the connection sleeve 18 and opens into the straight portion 50 of the main channel 46. The straight portion 50 of the main channel 46 is formed in a conduit 47. The main channel 46 extends partly inside the main chamber 28, passes through the piston head 26 and extends partly inside the piston rod 26. The straight portion 50 of the main channel 46 extends along the sliding axis X.

The conduit 47 has a first end secured to the connection sleeve 18 and therefore to the bottom 20 of the suspension body 16, so that the main channel 46 is fixed relative to the inner tube 14. The conduit 47 has a second end, opposite to the first end, extending into the enclosure 34 and provided with a cap 52 closing the main channel 46. The main channel has a length slightly less than the length of the inner tube 14.

The main channel 46 further comprises an evacuation orifice 54 formed in the wall of the conduit and extending radially relative to the sliding axis X. The evacuation orifice 54 and the main channel are in fluid communication.

The enclosure 34 is movable in translation with the piston 22 relative to the main channel 46, along the sliding axis X. The piston 22, the enclosure 34 and the outer tube 12 are fixed relative to each other.

The fluid distribution device 40 in addition comprises a secondary channel 56, formed in the connection sleeve 18 and opening into the main chamber 28. In this non-limiting example, the secondary channel comprises an axial portion extending along the sliding axis X and a radial portion extending radially relative to the sliding axis X.

In this non-limiting example, the fluid distribution device 40 further comprises a removable plug 58 mounted at the upper end of the suspension body 16 and in which the main fluid inlet 42 is formed. An inner housing 60 is formed in this removable plug 58 in order to fluidly communicate the main fluid inlet 42 with the main channel 46 and the secondary channel 56.

The secondary channel 56 comprises a check valve 62 provided with a spring. The check valve 62 can assume a first state in which it prevents a fluid from escaping from the main chamber 28 and a second state in which it allows the fluid to escape from the main chamber 28. The check valve 62 is further configured to open and allow the entry of the fluid into the main chamber 28 when the pressure of said fluid upstream of said check valve is greater than a predetermined pressure threshold.

The steps of adjusting the preload of the adjustable suspension 10 described above will be detailed using FIGS. 3 to 10.

First, the main chamber 28 is substantially emptied of fluid. The user then gets on the bike, so as to compress the adjustable suspension. The piston 22 is then placed in a first position illustrated in FIGS. 3, 4 and 5. In this first position, the piston head 24 is disposed at a distance d1 from the bottom 20 of the suspension body. Furthermore, the evacuation orifice 54 opens into the enclosure 34, so that the main fluid inlet 42 is in fluid communication with said enclosure 34 via the main channel 46.

The user then injects a fluid, for example a gas such as carbon dioxide, through the main fluid inlet 42 disposed on the removable plug 58. The fluid may be contained in a cartridge. Alternatively, the user can connect a pump to the main inlet. The circulation of the fluid is illustrated by arrows. The fluid then penetrates into the housing 60 of the removable plug. The pressure of the injected fluid, upstream of the check valve, is insufficient to allow the opening of the check valve 62 and therefore the entry of the fluid into the main chamber 28. The fluid is guided through the main channel 46 to the enclosure 34, as illustrated in FIG. 5. Said enclosure is closed and, in this first position of the piston, the distribution device 40 is configured to maintain the fluid injected into the suspension. Also, the pressure within the enclosure 34, the main channel 46 and the housing 60 formed in the removable plug gradually increases with the injection of the fluid.

When the pressure in the main channel 46, in the housing and therefore upstream of the check valve 62 becomes greater than the predetermined pressure threshold for opening said check valve 62, the latter opens and allows the entry of the fluid into the main chamber 28, via the secondary channel 56. This step is illustrated in FIG. 6. The pressure in the main chamber 28 increases due to the fluid penetrating therein. In parallel, a portion of the fluid injected through the main fluid inlet continues to be brought into the main channel.

A force is then exerted by the fluid present in the main chamber on the piston head 24, oriented along the sliding axis X, in a direction opposite to the main fluid inlet 42. The piston 22 is then displaced relatively in said direction, to the fluid outlet 44, along the sliding axis X relative to the main channel 46. The distance between the bottom 20 of the suspension body 16 and the piston head 24 increases. Also, the volume of the main chamber 28 increases. More specifically, the inner tube 14 and the main channel 46 describe a relative translational movement, along the sliding axis X, relative to the piston 22, to the enclosure 34 and to the outer tube 12.

As can be seen from the passage from FIG. 3 to FIG. 7, the evacuation orifice 54 formed in the conduit 47 also describes a relative translational movement relative to the enclosure 34 and to the piston rod 26, until it no longer opens into said enclosure 34 but into the recess 36 formed in the piston rod 26. Consequently, the piston 22 is placed in a second position in which the piston head 24 and the bottom 20 of the suspension body are separated by a distance d2 greater than the initial distance d1. Furthermore, as illustrated in FIG. 8, the fluid injected through the main fluid inlet 42 is brought into the main channel 46, then into the recess 36, into the hole 38 passing through the piston rod 26, into the evacuation chamber 32 and is finally guided out of the adjustable suspension 10 via the fluid outlet 44.

According to the disclosure, the piston 22 passes from the first position to the second position automatically, by continuous injection of fluid through the main fluid inlet 42.

In this second position of the piston 22, illustrated in FIG. 8, the main fluid inlet 42 is in fluid communication with the fluid outlet 44 so that the injected fluid is evacuated from the adjustable suspension 10 through said fluid outlet. Consequently, the pressure within the main channel 46 and the housing 60 formed in the removable plug 58, and therefore upstream of the check valve 62 decreases and becomes lower than the predetermined pressure threshold for opening the check valve 62.

Also, the fluid no longer enters the main chamber 28 and the piston 22 is no longer displaced relative to the main channel 46. Furthermore, the check valve 62 is by default in a first state in which it prevents the fluid from escaping from the main chamber 28 so that the amount of fluid present in said main chamber remains constant. The preload of the suspension is then adjusted and no longer changes, despite the continuation of the injection of fluid through the main fluid inlet 42. Also according to the disclosure, the preload is adjusted very easily, by injecting the fluid continuously through the main fluid inlet. The user is not required to adjust the preload.

Insofar as the user is placed on the bicycle during the adjustment, the second position of the piston 22, for which the evacuation orifice 54 opens out of the enclosure 34, is conditioned by the weight of the user. Also, the preload, or SAG, is adjusted according to the weight of the user.

The user can then get off the bicycle, which is illustrated by the passage from FIG. 7 to FIG. 9. Due to the pressure exerted by the fluid present within the main chamber 28, the outer tube 12 and the main channel 46 are further translated and the volume of the main chamber 28 further increases until a third position of the piston 22, which corresponds to a rest position of the adjustable suspension. In this third position, the piston head 24 and the bottom 20 of the suspension body are separated by a distance d3 greater than the initial distance d1 and the distance d2. The stroke of the piston 22 between these second and third positions corresponds to the preload previously adjusted. As illustrated in FIG. 10, even if the injection of fluid is continued, the fluid is brought out of the suspension via the fluid outlet.

The user can then detach the removable plug 58 from the suspension body 16, which has the consequence of fluidly communicating the main channel 46 with the atmosphere. An advantage is to empty the fluid possibly present in the main channel 46. The check valve 62, which is in the first state, maintains the fluid present in the main chamber 28. The size and the weight of the suspension are therefore reduced by removing the removable plug 58.

When the user wishes to adjust the preload again, the check valve 62 should be placed in a second state, in which the fluid escapes from the main chamber 28, so as to be able to place the piston in the first position and repeat the steps detailed above.

FIG. 11 illustrates a bicycle comprising a fork 8 provided with an adjustable suspension 10 according to the disclosure.

The invention claimed is:

1. An adjustable suspension for a bicycle, comprising:
   a suspension body having a bottom;
   a piston disposed in the suspension body and comprising a piston head, the bottom and the piston head delimiting a main chamber inside said suspension body, the piston being movable in translation in the suspension body; and
   a fluid distribution device comprising a main fluid inlet configured to inject a fluid into the suspension and a fluid outlet, the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet directly to the fluid outlet, without entering the main chamber, in order to evacuate the fluid out of the suspension, the fluid distribution device being configured to automatically bring the piston from the first position to the second position when fluid is injected through the main fluid inlet.

2. The adjustable suspension according to claim 1, wherein the volume of the main chamber when the piston is in the first position is less than the volume of the main chamber when the piston is in the second position.

3. The adjustable suspension according to claim 1, wherein the fluid distribution device is configured so that the fluid injected through the main fluid inlet remains in the suspension when the piston is in the first position.

4. The adjustable suspension according to claim 1, wherein the fluid distribution device comprises a main channel fluidly communicating with the main fluid inlet and including at least one evacuation orifice, the adjustable suspension comprising an enclosure movable in translation with the piston relative to the main channel, the evacuation orifice opening into said enclosure when the piston is in the first position and opening out of the enclosure when the piston is in the second position.

5. The adjustable suspension according to claim 4, wherein the piston comprises a piston rod cooperating with the piston head, the main channel extending at least partly in said piston rod.

6. The adjustable suspension according to claim 5, wherein the enclosure is at least partly disposed in the piston rod.

7. The adjustable suspension according to claim 4, wherein said at least one evacuation orifice opens into an evacuation chamber fluidly communicating with the fluid outlet, when said piston is in the second position.

8. The adjustable suspension according to claim 7, wherein the enclosure and the main channel extend into the evacuation chamber.

9. The adjustable suspension according to claim 4, wherein the fluid distribution device further comprises a secondary channel fluidly communicating with the main fluid inlet and with the main chamber in order to bring the fluid injected through the main fluid inlet into said main chamber, when the piston is in the first position.

10. The adjustable suspension according to claim 9, wherein the secondary channel comprises a check valve configured to prevent the fluid from escaping from the main chamber when it is in a first state, and to allow the fluid to escape from the main chamber when it is in a second state.

11. The adjustable suspension according to claim 9, wherein the fluid distribution device comprises a plug configured to be removably mounted on the suspension body and in which the main fluid inlet is formed, said plug being shaped to establish fluid communication between the main fluid inlet, the main channel and the secondary channel, when said plug is mounted on the suspension body.

12. The adjustable suspension according to claim 1, wherein the fluid is a gas.

13. A bicycle including at least one adjustable suspension according to claim 1.

14. A method for adjusting an adjustable suspension for a bicycle, comprising:
- providing an adjustable suspension comprising:
  - a suspension body having a bottom;
  - a piston disposed in the suspension body and comprising a piston head, the bottom and the piston head delimiting a main chamber inside said suspension body, the piston being movable in translation in the suspension body; and
  - a fluid distribution device comprising a main fluid inlet configured to inject a fluid into the suspension and a fluid outlet, the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet directly to the fluid outlet, without entering the main chamber, in order to evacuate the fluid out of the suspension;
- including the main chamber in fluid communication with the atmosphere;
- compressing the suspension so as to evacuate the fluid from the main chamber and place the piston in the first position; and
- injecting the fluid into the main chamber through the main fluid inlet of the fluid distribution device so as to displace the piston to its second position, in which the fluid injected through the main fluid inlet is directly guided to the fluid outlet without entering the main chamber.

15. An adjustable suspension for a bicycle, comprising:
a suspension body having a bottom;
a piston disposed in the suspension body and comprising a piston head, the bottom and the piston head delimiting a main chamber inside said suspension body, the piston being movable in translation in the suspension body;
a fluid distribution device comprising a main fluid inlet configured to inject a fluid into the suspension, a fluid outlet, and a main channel fluidly communicating with the main fluid inlet and including at least one evacuation orifice; and
an enclosure movable in translation with the piston relative to the main channel,
the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet directly to the fluid outlet in order to evacuate the fluid out of the suspension, the evacuation orifice of the fluid distribution device opening into said enclosure when the piston is in the first position and opening out of the enclosure when the piston is in the second position, the fluid distribution device being configured to automatically bring the piston from the first position to the second position when fluid is injected through the main fluid inlet.

16. A method for adjusting an adjustable suspension for a bicycle, comprising:
- providing an adjustable suspension comprising:
  - a suspension body having a bottom;
  - a piston disposed in the suspension body and comprising a piston head, the bottom and the piston head delimiting a main chamber inside said suspension body, the piston being movable in translation in the suspension body;
  - a fluid distribution device comprising a main fluid inlet configured to inject a fluid into the suspension, a fluid outlet and a main channel fluidly communicating with the main fluid inlet and including at least one evacuation orifice; and
  - an enclosure movable in translation with the piston relative to the main channel,
  the piston being able to assume a first position in which the fluid distribution device is configured to bring the fluid injected through the main fluid inlet into the main chamber so as to deploy the piston and a second position in which the fluid distribution device is configured to guide the fluid injected through the main fluid inlet directly to the fluid outlet in order to evacuate the fluid out of the suspension, the evacuation orifice of the fluid distribution device opening into said enclosure when the piston is in the first position and opening out of the enclosure when the piston is in the second position;
- including the main chamber in fluid communication with the atmosphere;
- compressing the suspension so as to evacuate the fluid from the main chamber and place the piston in the first position; and
- injecting the fluid into the main chamber through the main fluid inlet of the fluid distribution device so as to displace the piston to its second position, in which the fluid injected through the main fluid inlet is directly guided to the fluid outlet.

\* \* \* \* \*